United States Patent [19]

Kioka et al.

[11] Patent Number: 5,623,033
[45] Date of Patent: Apr. 22, 1997

[54] TITANIUM CATALYST COMPONENT FOR ETHYLENE POLYMERIZATION, ETHYLENE POLYMERIZATION CATALYST, AND PROCESS FOR ETHYLENE POLYMERIZATION USING THE SAME

[75] Inventors: Mamoru Kioka; Tsuneo Yashiki, both of Waki-cho, Japan

[73] Assignee: Mitsui Petrochemical Industries, Ltd., Tokyo, Japan

[21] Appl. No.: 459,803

[22] Filed: Jun. 2, 1995

Related U.S. Application Data

[62] Division of Ser. No. 130,789, Oct. 4, 1993, Pat. No. 5,468,503.

[30] Foreign Application Priority Data

Oct. 5, 1992 [JP] Japan ................................ 4-266068

[51] Int. Cl.$^6$ ............................. C08F 4/654; C08F 4/655; C08F 10/02
[52] U.S. Cl. ............................. 526/124.8; 526/124.6; 526/352; 526/904
[58] Field of Search ................................ 526/124.8

[56] References Cited

U.S. PATENT DOCUMENTS

| | | | |
|---|---|---|---|
| 4,076,924 | 2/1978 | Toyota et al. | 526/124.8 |
| 4,186,107 | 1/1980 | Wagner . | |
| 4,294,948 | 10/1981 | Toyota et al. | 526/124.8 |
| 4,742,139 | 5/1988 | Kioka et al. | 526/124.8 |
| 5,091,353 | 2/1992 | Kioka et al. . | |
| 5,120,696 | 6/1992 | Tsutsui et al. . | |
| 5,180,702 | 1/1993 | Pettijohn . | |
| 5,192,731 | 3/1993 | Kioka et al. | 526/124.8 |
| 5,266,544 | 11/1993 | Tsutsui et al. . | |

FOREIGN PATENT DOCUMENTS

| | | |
|---|---|---|
| 0022675 | 1/1981 | European Pat. Off. . |
| 0494084A1 | 5/1989 | European Pat. Off. . |
| 57-159806 | 10/1982 | Japan . |
| 4-91106A | 3/1992 | Japan . |

OTHER PUBLICATIONS

Chemical Abstracts, 94:157564a, vol. 94, 1981, p. 20.
Chemical Abstracts, 92:199055z, vol. 92, 1980, p. 21.
J. Polymer Science, part A, vol. 26, 2014 (1988).
Chemical Abstracts, 104:187022q, vol. 104, 1986, p. 12.

Primary Examiner—Edward J. Smith
Attorney, Agent, or Firm—Sherman and Shalloway

[57] ABSTRACT

Disclosed is a titanium catalyst component for ethylene polymerization obtained by contacting [A] a solid magnesium aluminum complex containing magnesium, halogen, aluminum and an alkoxy group and/or alcohol having at least 6 carbon atoms, with [B] a tetravalent titanium compound. The solid magnesium aluminum complex [A] is obtained by contacting (a-1) a magnesium solution formed from a halogen-containing magnesium compound, an alcohol having at least 6 carbon atoms and a hydrocarbon solvent, with (a-2) an organoaluminum compound. Also disclosed is a process for ethylene polymerization comprising polymerizing ethylene or copolymerizing ethylene with an α-olefin having 3 to 20 carbon atoms in the presence of a catalyst for ethylene polymerization comprising [I] the above-mentioned titanium catalyst component for ethylene polymerization and [II] an organoaluminum compound catalyst component.

17 Claims, 1 Drawing Sheet

TITANIUM CATALYST COMPONENT FOR ETHYLENE POLYMERIZATION, ETHYLENE POLYMERIZATION CATALYST, AND PROCESS FOR ETHYLENE POLYMERIZATION USING THE SAME

This is a division of application Ser. No. 08/130,789 filed Oct. 4, 1993 which issued as U.S. Pat. No. 5,468,503 on Nov. 21, 1995.

FIELD OF THE INVENTION

The present invention relates to a titanium catalyst component for ethylene polymerization by the use of which an ethylene polymer having a narrow particle size distribution can be prepared with a high polymerization activity, to an ethylene polymerization catalyst comprising the titanium catalyst component, and to a process for ethylene polymerization using this ethylene polymerization catalyst.

BACKGROUND OF THE INVENTION

For preparing ethylene polymers, generally known in the art is a process of copolymerizing ethylene with an α-olefin or polymerizing ethylene in the presence of a Ziegler catalyst. In this process, a high-temperature solution polymerization wherein polymerization is conducted in a hydrocarbon solvent at a temperature higher than the melting point of the resultant polymer is broadly utilized. However, if a polymer having a high molecular weight is intended to be obtained, a polymer concentration in the polymer solution must be lowered because the viscosity of the polymer solution becomes high with increase of the molecular weight. As a result, a problem of low productivity of a polymer takes place.

On the other hand, in the case of conducting the polymerization by a slurry polymerization process, there resides other problem. That is, the resultant polymer swells easily in a polymerization solvent. As a result, the concentration of the slurry can be hardly heightened and a long-term continuous polymerization operation can be difficultly made.

The present inventors have studied in the light of the problems associated with the prior art as mentioned above, and proposed a titanium catalyst component for ethylene polymerization as described in, for example, Japanese Patent Laid-Open Publication No. 195108/1985. This titanium catalyst component is excellent in handling property as a slurry and makes it possible to conduct polymerization operation in a high concentration of the slurry. In the titanium catalyst, more than 70% by weight of titanium atoms are reduced to trivalent state. By the use of this titanium catalyst component, an ethylene polymer having an excellent composition (copolymer) distribution can be prepared with a high polymerization activity.

As described above, by the use of the catalyst component for ethylene polymerization disclosed in Japanese Patent Laid-Open Publication No. 195108/1985, ethylene can be polymerized with a high polymerization activity, and moreover, an ethylene copolymer having a narrow composition distribution and excellent morphology can be obtained. However, now eagerly desired is a titanium catalyst component for ethylene polymerization by the use of which an ethylene polymer can be prepared with a high polymerization activity.

Further, Japanese Patent Publication No. 45404/1988 discloses a process for the preparation of a solid titanium catalyst component. In this process, the solid titanium catalyst component is prepared by contacting a magnesium aluminum complex which is obtained by the contact of an alcohol solution of halogen-containing magnesium with an organoaluminum compound, an electron donor having no active hydrogen and titanium tetrachloride to react with each other. The solid titanium catalyst component obtained in this process has a good particle size distribution, and hence polyolefin obtained by using a catalyst comprising this solid titanium catalyst component also has a good particle size distribution. However, the advent of a solid titanium catalyst component which has excellent catalytic activity for ethylene polymerization has been eagerly desired.

Furthermore, Japanese Patent Laid-Open Publication No. 159806/1982 discloses:

a solid titanium catalyst component prepared by bringing a product obtained by reacting a reaction product $(a_1)$ of halogen-containing magnesium and an alcohol with an organoaluminum compound into contact with a halogen-containing titanium compound, said solid titanium catalyst component having a molar ratio of alkoxy group and/or alcohol to titanium of not more than 0.25;

a solid titanium catalyst component prepared by bringing a product obtained by reacting a reaction product $(a_1)$ of halogen-containing magnesium and an alcohol with an organoaluminum compound into contact with a halogen-containing titanium compound and subsequently bringing the resulting product into contact with an organoaluminum halide (halogenation agent), said solid titanium catalyst component having a molar ratio of alkoxy group and/or alcohol to titanium of not more than 0.9; and a solid titanium catalyst component obtained by bringing a product prepared by reacting a reaction product $(a_1)$ of halogen-containing magnesium and an alcohol with an organoaluminum compound into contact with an organoaluminum halide (halogenation agent), subsequently bringing the resulting product into contact with a halogen-containing titanium compound and further bringing the resulting product into contact with an organoaluminum halide (halogenation agent), said solid titanium catalyst component having a molar ratio of alkoxy group and/or alcohol to titanium of not more than 0.9.

In such solid titanium catalyst components, a molar ratio $Ti^{3+}/Ti^{4+}$ is in the range of 2.0 to 10, and most of the tetravalent titanium atoms are reduced into trivalent state. By the use of these catalyst components, ethylene can be polymerized with a high polymerization activity. However, further desired is the advent of a solid titanium catalyst component for ethylene polymerization which has a narrower particle size distribution and by the use of which ethylene can be polymerized with much higher polymerization activity.

Moreover, Japanese Patent Laid-Open Publication No. 91106/1992 discloses a solid titanium catalyst component obtained by contacting with each other:

a solid magnesium aluminum complex obtained by contacting a solution formed from halogen-containing magnesium, an alcohol and a hydrocarbon solvent with organoaluminum, a tetravalent compound in a liquid state, and a vanadium compound, a zirconium compound or a hafnium compound.

In the comparative example of the above Japanese Patent Laid-Open Publication No. 91106/1992, an experiment wherein 2-ethylhexoxytitanium trichloride was used as the tetravalent titanium compound and no vanadium compound was used is shown.

In such solid titanium catalyst component as obtained above, most of titanium atoms are reduced into trivalent state, and the catalyst component is low in the activity for ethylene polymerization. Accordingly, a solid titanium catalyst component having a much higher activity for ethylene polymerization is now desired.

OBJECT OF THE INVENTION

It is, therefore, an object of the present invention to provide a titanium catalyst component for ethylene polymerization by the use of which an ethylene polymer having a narrow particle size distribution can be prepared with a high polymerization activity, to provide an ethylene polymerization catalyst comprising the titanium catalyst component and to provide a process for polymerizing ethylene using this titanium catalyst component.

SUMMARY OF THE INVENTION

The titanium catalyst component for ethylene polymerization according to the present invention is a titanium catalyst component for ethylene polymerization prepared by contacting:

[A] a solid magnesium aluminum complex containing magnesium, halogen, aluminum and an alkoxy group and/or alcohol having at least 6 carbon atoms, said complex being obtained by contacting
(a-1) a magnesium solution formed from a halogen-containing magnesium compound, an alcohol having at least 6 carbon atoms and a hydrocarbon solvent, with
(a-2) an organoaluminum compound; with
[B] a tetravalent titanium compound,
wherein titanium atoms contained in the titanium catalyst component are substantially tetravalent and a molar ratio of alkoxy group and/or alcohol to titanium (OR/Ti) is in the range of 0.26 to 6.0.

This titanium catalyst component for ethylene polymerization contains, as essential components, magnesium, halogen, aluminum, an alkoxy group and/or alcohol having at least 6 carbon atoms and titanium.

A prepolymerized titanium catalyst component [I]' for ethylene polymerization according to the present invention is obtained by prepolymerizing an olefin to the titanium catalyst component [I] as mentioned above.

The first ethylene polymerization catalyst according to the present invention comprises the titanium catalyst component [I] and an organoaluminum compound [II].

The second ethylene polymerization catalyst according to the present invention comprises the prepolymerized titanium catalyst component[I]' and an organoaluminum compound [II].

The process for ethylene polymerization according to the present invention comprises polymerizing ethylene or copolymerizing ethylene with an α-olefin having 3 to 20 carbon atoms in the presence of the ethylene polymerization catalyst.

DETAILED DESCRIPTION

Figure 1:
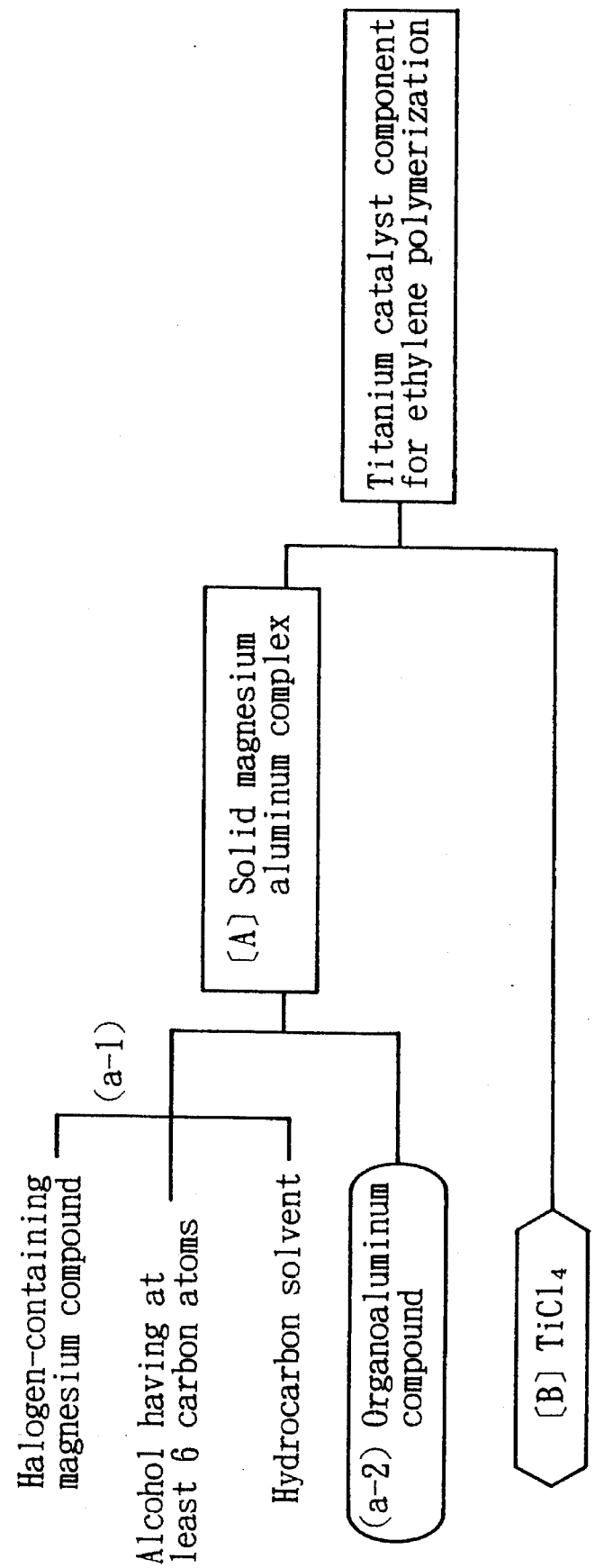
FIG. 1 shows steps of a process for preparing the titanium catalyst component for ethylene polymerization according to the present invention.

The titanium catalyst component for ethylene polymerization according to the present invention, a catalyst for ethylene polymerization containing the titanium catalyst component and a process for (co)polymerizing ethylene using the titanium catalyst component will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

FIG. 1 is an explanatory view showing one example of a process for preparing the titanium catalyst component for ethylene polymerization according to the present invention.

The titanium catalyst component for ethylene polymerization according to the present invention is obtained by contacting:

[A] a solid magnesium aluminum complex containing magnesium, halogen, aluminum and an alkoxy group and/or alcohol having at least 6 carbon atoms, said complex being obtained by contacting
(a-1) a magnesium solution formed from a halogen-containing magnesium compound, an alcohol having at least 6 carbon atoms and a hydrocarbon solvent, with
(a-2) an organoaluminum compound; with
[B] a tetravalent titanium compound.

First, the solid magnesium aluminum complex [A] containing magnesium, halogen, aluminum and an alkoxy group and/or alcohol having at least 6 carbon atoms is described below.

The solid magnesium aluminum complex [A] is obtained by contacting:

(a-1) a magnesium solution formed from a halogen-containing magnesium compound, an alcohol having at least 6 carbon atoms and a hydrocarbon solvent, with
(a-2) an organoaluminum compound.

In the solid magnesium aluminum complex [A], the atomic ratio Al/Mg (Al: aluminum, Mg: magnesium) is in the range of usually 0.05 to 1, preferably 0.08 to 0.7, more preferably 0.12 to 0.6. The alkoxy group and/or alcohol having at least 6 carbon atoms is contained, based on 1 part by weight of magnesium, in an amount of usually 0.5 to 15 parts by weight, preferably 2 to 13 parts by weight, more preferably 5 to 10 parts by weight. The atomic ratio $X^1$/Mg ($X^1$:halogen) is in the range of usually 1 to 3, preferably 1.5 to 2.5.

The solid magnesium aluminum complex [A] is desired to be particulate, and the diameters of the solid magnesium aluminum complex particles are preferably in the range of 1 to 200 μm, more preferably 2 to 100 μm. With respect to the particle size distribution of the complex [A], the geometrical standard deviation is preferably in the range of 1.0 to 2.0, particularly preferably 1.0 to 1.8.

Concrete examples of the halogen-containing magnesium compound for use in the preparation of the magnesium solution (a-1) in the invention include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride; and aryloxymagnesium halides, such as phenoxymagnesium chloride and methylphenoxymagnesium chloride.

These compounds may be used as a complex or double compound with another metal, or may be used as a mixture with another metallic compound. Of these, preferred are magnesium halides and alkoxymagnesium halides; more preferred are magnesium chloride and alkoxy magnesium chloride; and most preferred is magnesium chloride.

These compounds may be used singly or in combination. The magnesium compound solution (a-1), that is used in a liquid state in the invention, is formed from the halogen-containing magnesium compound, an alcohol having at least 6 carbon atoms and a hydrocarbon solvent.

Concrete examples of the alcohol having at least 6 carbon atoms for use in the invention include:

aliphatic alcohols, such as 2-methylpentanol, 2-ethylpentanol, 2-ethylbutanol, n-heptanol, n-octanol, 2-ethylhexanol, decanol, dodecanol, tetradecyl alcohol, undecenol, oleyl alcohol and stearyl alcohol;

alicyclic alcohols, such as cyclohexanol and methylcyclohexanol;

aromatic alcohols, such as benzyl alcohol, methylbenzyl alcohol, isopropylbenzyl alcohol, α-methylbenzyl alcohol and α, α-dimethylbenzyl alcohol; and alkoxy group-containing aliphatic alcohols, such as n-butyl cellosolve and 1-butoxy-2-propanol.

Preferred are alcohols having at least 7 carbon atoms.

Of these, 2-ethylhexanol is particularly preferred.

These alcohols may be used singly or in combination.

When the halogen-containing magnesium compound, the alcohol having at least 6 carbon atoms and a hydrocarbon solvent are brought into contact with each other, the halogen-containing magnesium compound is dissolved in the hydrocarbon solvent to give a magnesium solution.

Concrete examples of the hydrocarbon solvent include:

aliphatic hydrocarbons, such as propane, butane, n-pentane, isopentane, n-hexane, isohexane, n-heptane, n-octane, isooctane, n-decane, n-dodecane and kerosine;

alicyclic hydrocarbons, such as cyclopentane, methylcyclopentane, cyclohexane and methylcyclohexane;

aromatic hydrocarbons, such as benzene, toluene and xylene; and halogenated hydrocarbons, such as methylene dichloride, ethyl chloride, ethylene dichloride and chlorobenzene.

Of these, aliphatic hydrocarbons, particularly those of 3 to 10 carbon atoms, are preferably employed.

These hydrocarbon solvents may be used singly or in combination.

The contact of the halogen-containing magnesium compound, the alcohol having at least 6 carbon atoms and the hydrocarbon solvent with each other is carried out at a temperature of usually not lower than room temperature, preferably not lower than 65° C., more preferably about 80° to 300° C., most preferably about 100° to about 200° C., for a period of 15 minutes to 5 hours, preferably 30 minutes to 3 hours, though these conditions vary depending upon the compound and the alcohol used, etc.

The alcohol is used in an amount of generally not less than 1 mol, preferably about 1.5 to about 20 mol, more preferably about 2.0 to about 12 mole, per 1 mol of the halogen-containing magnesium compound, though this amount varies depending upon the magnesium compound and the solvent used, etc.

By contacting the magnesium solution (a-1) with an organoaluminum compound (a-2), a solid magnesium aluminum complex [A] is obtained.

Preferably used as the organoaluminum compound (a-2) in the invention is, for example, an organoaluminum compound represented by the following formula (iv):

$$R^a_n AlX_{3-n} \quad \text{(iv)}$$

wherein $R^a$ is a hydrocarbon group of 1 to 12 carbon atoms, X is a halogen atom or hydrogen, and n is 1 to 3.

The hydrocarbon group of 1 to 12 carbon atoms includes an alkyl group, a cycloalkyl group and an aryl group. Examples of such groups include methyl, ethyl, n-propyl, isopropyl, isobutyl, pentyl, hexyl, octyl, cyclopentyl, cyclohexyl, phenyl and tolyl.

Concrete examples of such organoaluminum compound (a-2) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula (v):

$$R^a_n AlY_{3-n} \quad \text{(v)}$$

wherein $R^a$ is the same as $R^a$ in the above formula (iv); n is 1 or 2; and Y is $-OR^b$, $-OSiR^c_3$, $-OAlR^d_2$, $-NR^e_2$, $-SiR^f_3$ or $-N(R^g)AlR^h_2$ (wherein $R^b$, $R^c$, $R^d$ and $R^h$ are each methyl, ethyl, isopropyl, isobutyl, cyclohexyl or phenyl; $R^e$ is hydrogen, methyl, ethyl, isopropyl, phenyl or trimethylsilyl; and $R^f$ and $R^g$ are each methyl or ethyl).

Concrete examples of such organoaluminum compounds include:

(1) compounds of the formula $R^a_n Al(OR^b)_{3-n}$, such as dimethylaluminum methoxide, diethylaluminum ethoxide and diisobutylaluminum methoxide;

(2) compounds of the formula $R^a_n Al(OSiR^c_3)_{3-n}$, such as Et$_2$Al (OSiMe$_3$), (iso-Bu)$_2$Al (OSiMe$_3$) and (iso-Bu)$_2$Al (OSiEt$_3$);

(3) compounds of the formula $R^a_n Al(OAlR^d_2)_{3-n}$, such as Et$_2$AlOAlEt$_2$ and (iso-Bu)$_2$AlOAl (iso-Bu)$_2$;

(4) compounds of the formula $R^a_n Al(NR^e_2)_{3-n}$, such as Me$_2$AlNEt$_2$, Et$_2$AlNHMe, Me$_2$AlNHEt, Et$_2$AlN(Me$_3$Si)$_2$ and (iso-Bu)$_2$AlN(Me$_3$Si)$_2$;

(5) compounds of the formula $R^a_n Al(SiR^f_3)_{3-n}$, such as (iso-Bu)$_2$AlSiMe$_3$; and (6) compounds of the formula $R^a_n Al[N(R^g)AlR^h_2]_{3-n}$, such as Et$_2$AlN(Me)AlEt$_2$ and (iso-Bu)$_2$AlN(Et)Al(iso-Bu)$_2$.

In addition, also employable as the the organoaluminum compound (a-2) is a complex alkylate which is formed from a metal of Group I of the periodic table and aluminum, said complex alkylate being represented by the following formula:

$$M^1AlR^j_4$$

wherein $M^1$ is Li, Na or K, and $R^j$ is a hydrocarbon group of 1 to 15 carbon atoms.

Concrete examples of such complex alkylate include LiAl $(C_2H_5)_4$ and LiAl $(C_7H_{15})_4$.

Of the organoaluminum compounds as exemplified above, preferably used are trialkylaluminum, dialkylaluminum halide, dialkylaluminum hydride and dialkylaluminum alkoxide. Of these, trialkylaluminum, particularly triethylaluminum, is preferred because a catalyst with a favorable shape can be obtained by using it.

These organoaluminum compounds may be used alone or in combination.

For forming the solid magnesium aluminum complex [A], the organoaluminum compound (a-2) is desirably used in such an amount that the molar ratio (ROH/Al) of the alcohol (ROH) having at least 6 carbon atoms used for the preparation of the magnesium solution (a-1) to the aluminum atom (Al) contained in the organoaluminum compound (a-2) is in the range of about 0.5 to 7, preferably 1 to 5.

The contact of the magnesium solution (a-1) with the organoaluminum compound (a-2) can be carried out by dropwise adding the organoaluminum compound (a-2) slowly to the magnesium solution (a-1) having a magnesium concentration of preferably 0.005 to 2 mol/l, more preferably 0.05 to 1 mol/l, with stirring of the magnesium solution. In this manner, a solid magnesium aluminum complex [A] having excellent particle properties (excellent morphology) can be obtained.

The temperature for contacting the magnesium solution (a-1) with the organoaluminum compound (a-2) is in the range of usually −50 to 150° C., preferably −30 to 100° C.

The solid magnesium aluminum complex [A] thus obtained contains no reducing organic group, and hence it exhibits no reduction ability.

The titanium catalyst component for ethylene polymerization [I] according to the present invention is obtained by contacting the above-described solid magnesium aluminum complex [A] with a tetravalent compound [B].

Preferably used as the tetravalent titanium compound [B] is a compound represented by the following formula (ii):

$$Ti(OR^2)_g X_{4-g} \quad (ii)$$

wherein R is a hydrocarbon group, X is a halogen atom, and $0<g<3$.

Concrete examples of such titanium tetravalent compound [B] include:

titanium tetrahalides, such as $TiCl_4$, $TiBr_4$ and $TiI_4$;

alkoxytitanium trihalides, such as
  $Ti(OCH_3)Cl_3$,
  $Ti(OC_2H_5)Cl_3$,
  $Ti(On-C_4H_9)Cl_3$,
  $Ti(OC_2H_5)Br_3$, and
  $Ti(O-iso-C_4H_9)Br_3$;

dialkoxytitanium dihalides, such as
  $Ti(OCH_3)_2Cl_2$,
  $Ti(OC_2H_5)_2Cl_2$,
  $Ti(On-C_4H_9)_2Cl_2$, and
  $Ti(OC_2H_5)_2Br_2$; and trialkoxytitanium monohalides, such as
  $Ti(OCH_3)_3Cl$,
  $Ti(OC_2H_5)_3Cl$,
  $Ti(On-C_4H_9)_3Cl$, and
  $Ti((OC_2H_5)_3Br$.

Of these, preferably used are titanium tetrahalides and particularly preferred is titanium tetrachloride.

These compounds may be used singly or in combination.

The tetravalent titanium compound [B] is used in such an amount that the atomic ratio (Ti/(Mg+Al)) of the titanium (Ti) contained in the compound [B] to the magnesium and the aluminum contained in the solid magnesium aluminum complex [A] is in the range of 0.005 to 18, preferably 0.01 to 15.

The contact of the solid magnesium aluminum complex [A] with the tetravalent titanium compound [B] is carried out preferably in a hydrocarbon solvent. As the hydrocarbon solvent, those similar to the aforesaid hydrocarbons can be employed.

In the invention, the contact is carried out at a temperature of usually 0° to 150° C., preferably 50° to 130° C., more preferably 50° to 120° C.

The titanium catalyst component for ethylene polymerization according to the invention can be obtained in the manner as described above, and it contains, as essential components, magnesium, halogen, aluminum, an alkoxy group and/or alcohol having at least 6 carbon atoms and titanium. The titanium contained in this titanium catalyst component is substantially in a tetravalent state, namely more than 90%, preferably more than 95%, most preferably 100% of titanium atoms are in the tetravalent state.

The atomic ratio Ti/Mg of the titanium catalyst component is in the range of usually 0.01 to 1.5, preferably 0.05 to 1.0.

The atomic ratio Al/Mg of the titanium catalyst component is in the range of usually 0.1 to 2.0, preferably 0.13 to 1.5, most preferably 0.15 to 1.2.

The molar ratio of alkoxy group and/or alcohol to titanium (OR)/Ti of the titanium catalyst component is in the range of 0.26 to 6.0, preferably 0.26 to 5.0, most preferably 0.26 to 4.0.

The amount of the alkoxy group and/or alcohol having at least 6 carbon atoms is in the range of usually 0.1 to 15 parts by weight, preferably 0.3 to 10 parts by weight, more preferably 0.5 to 6 parts by weight, based on 1 part by weight of magnesium.

The titanium catalyst component is preferably in the form of particles, and the particle diameter thereof is preferably in the range of 1 to 200 μm, more preferably 2 to 100 μm. The geometrical standard deviation of the titanium catalyst component particles in the particle size distribution is in the range of 1.0 to 2.0, preferably 1.0 to 1.8.

The prepolymerized titanium catalyst component [I]' for ethylene polymerization according to the present invention is obtained by prepolymerizing an olefin to a catalyst comprising [I] the titanium catalyst component as mentioned above and [II] an organoaluminum compound as mentioned above.

The olefins to be polymerized to the titanium catalyst component [I] include ethylene and α-olefin having 3–20 carbon atoms aforementioned.

Of these, preferably ethylene is prepolymerized or ethylene and α-olefin having 3–20 carbon atoms or ethylene are prepolymerized.

The catalyst for ethylene polymerization according to the present invention comprises

[I] the titanium catalyst component for ethylene polymerization as mentioned above, and

[II] the organoaluminum compound as mentioned above.

The another catalyst for ethylene polymerization according to the present invention comprises

[I]' the prepolymerized titanium catalyst component as mentioned above, and

[II] the organoaluminum compound as mentioned above.

In accordance with the process for ethylene polymerization according to the present invention, ethylene is polymerized or copolymerized with an α-olefin having 3 to 20 carbon atoms in the presence of a catalyst for ethylene polymerization formed from [I] the above-described titanium catalyst for ethylene polymerization and [II] an organoaluminum compound catalyst component.

Examples of the α-olefins having 3 to 20 carbon atoms to be copolymerized with ethylene includes propylene, 2-methylpropylene, 1-butene, 1-hexene, 1-pentene, 4-methyl-1-pentene, 3-methyl-1-pentene, 1-octene, 1-nonene, 1-decene, 1-undecene and 1-dodecene. The α-olefins may be copolymerized with polyenes. Examples of such polyenes include butadiene, isoprene, 1,4-hexadiene, dicyclopentadiene and 5-ethylidene-2-norbornene.

The copolymer of ethylene with the α-olefin thus obtained contains constituent units derived from ethylene preferably in an amount of at least 90% by mol.

As the organoaluminum compound [II] for use in the polymerization, the aforesaid organoaluminum compound (a-2) used in the preparation of the titanium catalyst component for ethylene polymerization [I] can be employed.

In the polymerization, the titanium catalyst component for ethylene polymerization [I] is used in an amount of generally about 0.00001 to about 1 mmol, preferably about 0.0001 to about 0.1 mmol, in terms of Ti atom, per 1 liter of the polymerization reaction volume.

The organoaluminum compound [II] is used in an amount of 1 to 1,000 mol, preferably 2 to 500 mol, per 1 g.atom of the titanium contained in the titanium catalyst component for ethylene polymerization [I], according to necessity.

The titanium catalyst component for ethylene polymerization may be supported on a carrier. Examples of such a carrier include $Al_2O_3$, $SiO_2$, $B_2O_3$, $MgO$, $CaO$, $TiO_2$, $ZnO$, $Zn_2O$, $SnO_2$, $BaO$, $ThO$ and resins such as a styrene/divinylbenzene copolymer.

Further, the catalyst for ethylene polymerization as described above may be prepolymerized with ethylene.

Hydrogen may be used in the polymerization stage, whereby a molecular weight of a polymer to be obtained can be regulated.

In the present invention, the polymerization of ethylene may be carried out by either a liquid phase polymerization, such as a solution polymerization and a suspension polymerization, or a gas phase polymerization. Further, the polymerization may be carried out either batchwise, semi-continuously or continuously.

When a slurry polymerization is carried out, any of an inert solvent and ethylene which is liquid at a polymerization temperature may be used as a reaction solvent.

Examples of such inert solvents include aliphatic hydrocarbons, such as propane, butane, n-pentane, isopentane, n-hexane, isohexane, n-heptane, n-octane, isooctane, n-decane, n-dodecane and kerosine; alicyclic hydrocarbons, such as cyclopentane, methylcyclopentane, cyclohexane and methylcyclohexane; and aromatic hydrocarbons, such as benzene, toluene, xylene and ethylbenzene. These inert solvents may be used singly of in combination.

The polymerization temperature is in the range of usually 20° to 150° C., preferably 50° to 120° C., more preferably 70° to 110° C.; and the polymerization pressure is in the range of usually 1 to 1,000 kg/cm², preferably 2 to 40 kg/cm².

The copolymerization may be carried out in plural steps.

The ethylene polymer obtained as above may be either a homopolymer of ethylene, an ethylene/α-olefin random copolymer or a block copolymer, but preferred are a homopolymer of ethylene and a random copolymer of ethylene with an α-olefin.

Particularly preferably, an ethylene homopolymer or an ethylene/α-olefin copolymer, having a density of 0.900 to 0.970 g/cm³, preferably 0.910 to 0.970 g/cm³, is prepared in the present invention. The density used herein is that determined in accordance with ASTM D1505.

According to the present invention as described above, ethylene can be (co)polymerized with a high polymerization activity, and moreover, ethylene can be copolymerized with an α-olefin of 3 to 20 carbon atoms.

In the invention, the ethylene (co)polymer is obtained in the form of particles, and the particle diameter is in the range of generally 10 to 1,500 μm, preferably 10 to 1,000 μm.

The geometrical standard deviation of the particles is in the range of 1.0 to 2.0, preferably 1.0 to 1.8.

The ethylene (co)polymer obtained as above according to the present invention has a narrow particle size distribution.

In the powdery (co)polymer of the present invention, it is desired that the particles having a diameter of not smaller than 850 μm are contained in an amount of not more than 1.0% by weight, preferably not more than 0.8% by weight, particularly preferably not more than 0.5% by weight; the particles having a diameter of not larger than 100 μm are contained in an amount of not more 7.0% by weight, preferably not more than 5.0% by weight, particularly preferably not more than 3.0% by weight; and the particles having a diameter of 100 to 500 μm are contained in an amount of not less than 85% by weight, preferably not less than 90% by weight; each being based on the total weight of the particles.

The ethylene (co)polymer obtained in the invention may contain various additives, such as heat stabilizers, weathering stabilizers, antistatic agents, anti-blocking agents, lubricants, nucleating agents, pigments, dyes, inorganic fillers and organic fillers.

EFFECT OF THE INVENTION

In the titanium catalyst component for ethylene polymerization according to the present invention, the halogen-containing titanium compound is supported on the solid magnesium aluminum complex, and the titanium contained in this catalyst component is in a tetravalent state. Hence, use of the titanium catalyst component makes it possible to polymerize ethylene with a high polymerization activity, and moreover, when ethylene is copolymerized with an α-olefin of 3 to 20 carbon atoms, an ethylene copolymer having a narrow particle size distribution can be prepared.

Specifically, by the use of the titanium catalyst component for ethylene polymerization, ethylene (co)polymer particles having a narrow particle size distribution can be obtained, and extremely small sized particles are produced in only a small amount.

The process for ethylene (co)polymerization according to the present invention is carried out using such titanium catalyst component for ethylene polymerization as described above to provide an ethylene (co)polymer having a narrow particle size distribution and excellent morphology with a high polymerization activity. When the polymerization is carried out in a slurry polymerization, a slurry-handling property is also excellent.

EXAMPLE

The present invention will be described below in more detail with reference to examples, but it should be construed that the invention is in no way limited to those examples.

Analysis of the catalyst for ethylene polymerization and measurements of the particle size distribution and further the geometrical standard deviation are carried out in the following manner.

1. Mg, Al, Ti

Content determination of Mg, Al and Ti was carried out by ICP analysis using an analyzer (ICPF1000TR, produced by Shimazu Seisakusho K.K.).

2. Cl

Content determination of Cl was carried out by a silver nitrate titration method.

3. OR group

Content determination of OR group (or alcohol) was carried out as follows.

A well dried catalyst was added to an acetone solution containing 10% by weight of water to undergo hydrolysis so as to obtain ROH, and the ROH was determined by means of gas chromatography.

4. Particle size distribution and geometrical standard deviation

The particle size distribution and the geometrical standard deviation were measured by the use of a vibrator (low-tap type, produced by Iida Seisakusho K.K.) and a sieve (Iida lasting sieve of JIS-Z-8801, inner diameter: 200 mm).

Example 1

[Preparation of a catalyst component]

4.8 g of a commercially available magnesium chloride anhydride, 19.5 g of 2-ethylhexanol and 200 ml of decane were heated at 140° C. for 3 hours to give a homogeneous solution containing the magnesium chloride. To the solution, a mixture solution composed of 60 mmol of triethylaluminum and 52 ml of decane was dropwise added at 20° C. over 30 minutes while stirring. Then, the temperature of the resulting mixture was elevated to 80° C. over 2 hours and heated at the same temperature for 2 hours. After completion of the reaction under heating, a solid portion was separated by filtration and washed once with 200 ml of decane, to obtain a solid magnesium aluminum complex.

The solid magnesium aluminum complex thus obtained was suspended again in 200 ml of decane, and to the resulting suspension was added 400 mmol of titanium tetrachloride to perform reaction at 80° C. for 2 hours. Then, the reaction product was well washed with hexane to obtain a hexane suspension of a solid catalyst. The composition of the solid catalyst is set forth in Table 2.

A portion (corresponding to 5 g of the solid catalyst) of the hexane suspension of the solid catalyst was withdrawn and this portion was introduced into a 300 ml reactor equipped with a Teflon stirrer. To the reactor was further added 0.5 g of liquid paraffin, and the content of the reactor was stirred. Then, the reactor was placed in a bath of 40° C. while causing nitrogen to pass through the reactor at a rate of 80 Nl/Hr, to evaporate hexane. By the evaporation, a powdery Ti catalyst component containing about 10% of liquid paraffin was obtained. [Polymerization]

A 2-liter autoclave was charged with 1 liter of purified hexane in a nitrogen atmosphere. Then, 1.0 mmol of triethylaluminum and the powdery Ti catalyst component obtained in the above were suspended in hexane, and 0.1 mmol (in terms of Ti atom) of the resulting suspension was added to the polymerizer. The temperature of the system was elevated to 80° C., and to the polymerizer was fed 4.0 kg/cm$^2$G of hydrogen and was then further fed ethylene continuously over 2 hours so that the total pressure was kept at 8.0 kg/cm$^2$G. The temperature during the polymerization was kept at 80° C.

After the polymerization was completed, an ethylene polymer produced was separated from the hexane solvent and dried.

The results of measurements on the properties of the ethylene polymer are set forth in Table 3.

The yield of the powdery polymer obtained was 227 g, and the polymer had MFR of 2.7 g/10 min and an apparent bulk specific gravity of 0.33 g/cc.

The particle size distribution of the powdery polymer is set forth in Table 1.

TABLE I

| >850 μm | 850 μm ~ 500 μm | 500 μm ~ 250 μm | 250 μm ~ 180 μm | 180 μm ~ 100 μm | 100 μm ~ 45 μm | <45 μm |
|---|---|---|---|---|---|---|
| 0 | 0.4 wt. % | 93.1 wt. % | 4.1 wt. % | 1.8 wt. % | 0.6 wt. % | 0 |

Example 2

Preparation of a catalyst component and polymerization were carried out in a manner similar to that of Example 1 except for varying the amount of 2-ethylhexanol from 19.5 g to 16.3 g and the amount of triethylaluminum from 60 mmol to 46 mmol.

The results of measurements on the properties of the polymer obtained are set forth in Table 3.

Example 3

Preparation of a catalyst component and polymerization were carried out in a manner similar to that of Example 2 except for varying the temperature condition after addition of 400 mmol of titanium tetrachloride from 80° C. to 100° C.

The results of measurements on the properties of the polymer obtained are set forth in Table 3.

Example 4

Preparation of a catalyst component and polymerization were carried out in a manner similar to that of Example 1 except for varying the amount of 2-ethylhexanol from 19.5 g to 16.3 g and the amount of triethylaluminum from 60 mmol to 43 mmol.

The results of measurements on the properties of the polymer obtained are set forth in Table 3.

Example 5

Preparation of a catalyst component and polymerization were carried out in a manner similar to that of Example 1 except for varying the amount of 2-ethylhexanol from 19.5 g to 15.3 g and the amount of triethylaluminum from 60 mmol to 41 mmol.

The results of measurements on the properties of the polymer obtained are set forth in Table 3.

Comparative Example 1

4.8 g of a commercially available magnesium chloride anhydride, 19.5 g of 2-ethylhexanol and 200 ml of decane were heated at 140° C. for 3 hours to give a homogeneous solution containing magnesium chloride. To the solution, a mixture solution composed of 52 mmol of triethylaluminum and 45 ml of decane was dropwise added at 20° C. over 30 minutes while stirring. Then, the temperature of the resulting mixture was elevated to 80° C. over 2.5 hours and heated at 80° C. for 1 hour. After completion of the reaction under heating, the reaction slurry was allowed to stand, then the supernatant was removed, and to the remaining slurry containing a solid portion produced in the above reaction were added 200 ml of decane and 50 mmol of diethylaluminum chloride to perform reaction again at 80° C. for 1 hour. Subsequently, the solid portion was separated by filtration and washed once with 100 ml of decane, to prepare a solid component containing an organic group having reduction ability.

The solid component thus obtained was suspended again in 200 ml of decane, and to the resulting suspension was then added 25 mmol of titanium tetrachloride to perform reaction at 80° C. for 2 hours. Thereafter, a solid produced by the reaction was separated by filtration and washed 5 times with hexane, to obtain a titanium catalyst component.

Using the titanium catalyst component thus obtained, ethylene was polymerized in a manner similar to that of Example 1.

The results of measurements on the properties of the polymer obtained are set forth in Table 3.

TABLE 2

| | Composition of the solid catalyst (wt. %) | | | | | | Molar ratio of |
|---|---|---|---|---|---|---|---|
| | $Ti^4$ | $Ti^{3+}/Ti^{4+}$ | Mg | Al | Cl | OR | OR/Ti |
| Ex. 1 | 7.3 | 0 | 8.8 | 5.0 | 53 | 10.5 | 0.53 |
| Ex. 2 | 7.0 | 0 | 10.2 | 4.7 | 50 | 12.8 | 0.67 |
| Ex. 3 | 7.0 | 0 | 8.6 | 4.0 | 60 | 5.3 | 0.28 |
| Ex. 4 | 6.7 | 0 | 9.2 | 4.4 | 53 | 11.4 | 0.63 |
| Ex. 5 | 6.7 | 0 | 9.8 | 4.6 | 50 | 12.9 | 0.71 |
| Comp. Ex. 1 | | 5.7 | 12.0 | 0.7 | 43 | 34 | 2.20 |

Remark
OR: alkoxy group and/or alcohol

TABLE 3

| | Activity g-PE/g-catalyst | MFR g/10 min | Bulk Specific Gravity g/cc | Particle Size Distribution (wt. %) | | | Geometrical Standard Deviation |
|---|---|---|---|---|---|---|---|
| | | | | >500 μm | 100 μm ~ 500 μm | ≤100 μm | |
| Ex. 1 | 34,600 | 2.7 | 0.33 | 0.4 | 99.0 | 0.6 | 1.56 |
| Ex. 2 | 36,900 | 4.4 | 0.32 | 0 | 98.9 | 1.1 | 1.51 |
| Ex. 3 | 33,000 | 4.9 | 0.31 | 0.7 | 98.0 | 1.5 | 1.60 |
| Ex. 4 | 31,200 | 5.7 | 0.30 | 0.3 | 98.8 | 0.8 | 1.64 |
| Ex. 5 | 33,900 | 4.5 | 0.30 | 0.2 | 98.2 | 1.6 | 1.54 |
| Comp. Ex. 1 | 10,600 | 2.8 | 0.30 | 1.1 | 98.1 | 0.9 | 1.54 |

Comparative Example 2

[Catalyst]

30 mmol of a commercially available magnesium chloride anhydride was suspended in 150 ml of n-decane. To the resultant suspension was dropwise added 120 mmol of n-butanol over 1 hour with stirring of the suspension, to perform reaction at 80° C. for 3 hours. Then, to the suspension was further dropwise added 240 mmol of diethylaluminum monochloride at room temperature to perform reaction at 90° C. for 3 hours. The solid portion obtained in the reaction was washed and then suspended in n-decane to give a n-decane suspension. To the suspension was dropwise added 3 mmol of titanium tetrachloride to perform reaction at 25° C. for 10 minutes.

The composition of catalyst thus obtained is set forth in Table 4.

[Polymerization]

A stainless autoclave with a content volume of 2 liters was thoroughly purged with nitrogen, then charged with 1 liter of n-hexane and heated to 50° C. Thereafter, to the autoclave were added 1.0 mmol of triisobutylaluminum, 0.5 mmol of ethylene dichloride and 0.02 mmol (in terms of Ti atom) of the catalyst obtained in the above. After sealing of the autoclave, to the autoclave were fed hydrogen so that the gauge pressure was 4.5 kg/cm³ and then further fed ethylene so that the gauge pressure was 8 kg/cm³. The reaction system was kept at 80° C. for 2 hours while continuously feeding ethylene to the autoclave to keep the total pressure at 8 kg/cm³-G.

The yield of polyethylene thus obtained was 316 g. This amount corresponds to a polymerization activity of 16,800 g-PE/g-catalyst.

TABLE 4

| | Composition of the solid catalyst (wt. %) | | | | | | | Molar ratio of |
|---|---|---|---|---|---|---|---|---|
| | $Ti^{3+}$ | $Ti^{4+}$ | $Ti^{3+}/Ti^{4+}$ | Mg | Al | Cl | OR | OR/Ti |
| Comp. Ex. 2 | 3.6 | 1.5 | 2.4 | 17 | 4.2 | 70 | 1.4 | 0.10 |

Example 6 [Prepolymerization]

A 400 ml cylindrical flask equipped with a stirrer was charged with 200 ml of purified hexane, 6 mmol of triethylaluminum and 2 mmol (in terms of Ti atom) of a hexane suspension of the powdery titanium catalyst component obtained in Example 1. Thereafter, to the flask was fed ethylene at a feed rate of 1.74 Nl/hour over 3 hours at 20° C. to perform prepolymerization of the catalyst component with ethylene. The amount of polyethylene produced was 5 g based on 1 g of the catalyst.

[Polymerization]

A 2-liter autoclave was charged with 1 liter of purified hexane in a nitrogen atmosphere. To the autoclave were then added 1.0 mmol of triethylaluminum and 0.01 mmol (in terms of Ti atom) of the catalyst component having been subjected to the prepolymerization in the above stage, and the temperature of the system was elevated to 80° C. Thereafter, to the autoclave was fed hydrogen so that the pressure in the system was 4.0 kg/cm²-G, and was further fed ethylene continuously for 2 hours so that the total pressure was 8.0 kg/cm$^2$-G. The temperature during the polymerization stage was kept at 80° C. After the polymerization was completed, an ethylene polymer produced was separated from the hexane solvent and dried.

The results of measurement on the properties of the polymer are set forth in Table 5.

TABLE 5

| | Activity g-PE/g-catalyst | MFR g/10 min | Bulk Specific Gravity g/cc | Particle Size Distribution | | |
|---|---|---|---|---|---|---|
| | | | | >500 μm | 100 μm ~ 500 μm | ≦100 μm |
| Ex. 6 | 32,800 | 2.3 | 0.34 | 0.6 | 98.5 | 0.9 |

Comparative Example 3

In a 400 ml four-neck flask, 30 mmol of magnesium chloride anhydride was suspended in 150 ml of n-decane. To the resultant suspension was dropwise added 180 mmol of ethanol over 1 hour with stirring of the suspension, to perform reaction at room temperature for 1 hour. Through the reaction, a white powder was obtained from a swollen magnesium chloride. Then, to the reaction system was dropwise added 84 mmol of diethylaluminum monochloride at room temperature to perform reaction at 30° C. for 1 hour. Thereafter, 300 mmol of titanium tetrachloride was added to the reaction system, and the temperature of the system was elevated to 80° C. to perform reaction for 3 hours while stirring the reaction solution. After the reaction was completed, a solid portion was separated from the solution, and the solid portion was washed with 2 liters of n-decane.

[Polymerization]

A 2-liter stainless steel autoclave was thoroughly purged with nitrogen. Then, the autoclave was charged with 1 liter of n-hexane and was heated to 50° C. To the autoclave were added 1.0 mmol of triisobutylaluminum, 0.5 mmol of ethylene dichloride and 0.02 mmol (in terms of Ti atom) of the catalyst obtained in the above, and the autoclave was sealed. Thereafter, into the autoclave was pressed hydrogen until the gauge pressure became 4.5 kg/cm$^2$, and was further pressed ethylene until the gauge pressure became 8 kg/cm$^2$. Then, to the autoclave was continuously fed ethylene at 80° C. for 2 hours so that the total pressure was kept at 8 kg/cm$^2$-G.

The results of measurements on the properties of the polymer obtained are set forth in Table 6.

TABLE 6

| | Activity g-PE/g-catalyst | MFR g/10 min | Bulk Specific Gravity g/cc | Particle Size Distribution (wt. %) | | | Geometrical Standard Deviation |
|---|---|---|---|---|---|---|---|
| | | | | >500 μm | 100 μm ~ 500 μm | ≦100 μm | |
| Comp. Ex. 3 | 36,600 | 3.0 | 0.31 | 17.6 | 65.8 | 16.5 | 2.29 |

What is claimed is:

1. A process for ethylene polymerization comprising polymerizing ethylene or copolymerizing ethylene with an α-olefin having 3 to 20 carbon atoms in such an amount that the resulting polymer contains at least 90% by mole of ethylene in the presence of a catalyst for ethylene polymerization, said catalyst comprising:

(I) a titanium catalyst component for ethylene polymerization obtained by a process consisting essentially of:

mixing a halogen-containing magnesium compound, 2-ethylhexylalcohol and a hydrocarbon solvent to form a magnesium solution (a-1), contacting the magnesium solution (a-1) with triethylaluminum (a-2) to form a solid magnesium aluminum complex (A) containing no reducing organic group, wherein the organoaluminum compound (a-2) is used in such an amount that the molar ratio of the 2-ethylhexylalcohol used for the preparation of the magnesium solution (a-1) to the aluminum atom (Al) contained in the triethylaluminum (a-2) is in the range of about 1 to 5, the temperature for contacting the magnesium solution (a-1) with the triethylaluminum (a-2) is in the range of –50° to 150° C., and the contact of the magnesium solution (a-1) with the triethylaluminum (a-2) is carried out by adding the triethylaluminum (a-2) to the magnesium solution (a-1) having a magnesium concentration of 0.005 to 2 mol/liter; and contacting the solid magnesium aluminum complex (A) with a tetravalent titanium compound (B) to thereby form a titanium catalyst component, wherein the tetravalent titanium compound (B) is used in such an amount that the atomic ratio (Ti/(Mg+Al)) of the titanium (Ti) contained in the solid magnesium aluminum complex (A) is in the range of 0.005 to 18, and the contact of the solid magnesium aluminum complex (A) with the tetravalent titanium compound (B) is carried out at a temperature of 0° to 150° C., wherein titanium atoms contained in the titanium catalyst component are substantially tetravalent and wherein the molar ratio of alkoxy groups derived from the 2-ethylhexylalcohol and/or unconverted 2-ethylhexylalcohol or combination thereof to titanium is in the range of 0.26 to 6.0, the atomic ratio of Ti/Mg of the titanium catalyst component is in the range of 0.001 to 1.5, and the atomic ratio of Al/Mg of the titanium catalyst component is in the range of 0.1 to 2.0 and (II) an organoaluminum compound.

2. The process of claim 1 wherein the polymerization or copolymerization is carried out in the presence of from about 0.0001 to about 0.1 mol, in terms of Ti atom, of the titanium catalyst component (I), per liter of the polymerization reaction volume, and from 2 to 500 mol, per 1 g-atom of titanium contained in the titanium catalyst component (I), of the organoaluminum compound (II).

3. The process for ethylene polymerization as set forth in claim 1 wherein in the preparation of the titanium catalyst component (I) the solid magnesium aluminum complex (A)

is contacted with the tetravalent titanium compound (B) in the presence of a hydrocarbon solvent.

4. The process for ethylene polymerization as set forth in claim 1 wherein in the preparation of the titanium catalyst component (I) the solid magnesium aluminum complex is contacted (A) with the tetravalent titanium compound (B) at a temperature in the range of from 50° to 120° C.

5. The process for ethylene polymerization as set forth in claim 1 wherein in the preparation of the titanium catalyst component (I) the ratio of Al to Mg in the magnesium aluminum complex (A) is in the range of from 0.05 to 1.

6. The process for ethylene polymerization as set forth in claim 1 wherein in the preparation of the titanium catalyst component (I) the atomic ratio of halogen to Mg in the magnesium aluminum complex (A) is in the range of from 1 to 3.

7. The process for ethylene polymerization as set forth in claim 1 wherein in the preparation of the titanium catalyst component (I) the halogen-containing magnesium compound is magnesium chloride.

8. The process for ethylene polymerization as set forth in claim 1 wherein in the preparation of the titanium catalyst component (I) the solid magnesium aluminum complex (A) is washed with decane to thereby remove any reducing organic groups prior to contacting the complex (A) with the titanium compound (B).

9. The process of claim 1 wherein the ethylene polymer is obtained in the form of particles having a particle diameter in the range of from 10 to 1,500 μm with a geometrical standard deviation of the particles in the range of 1.0 to 2.0.

10. The process of claim 9 wherein the ethylene polymer particles have particle diameters in the range of from 10 to 1,000 μm and a geometrical standard deviation of the particles is in the range of 1.0 to 1.8.

11. The process of claim 1 wherein the ethylene polymer is in the form of particles having a particle size distribution characterized by an amount of no more than 1% by weight of said particles having a diameter larger than 850 μm; no more than 7% by weight of said particles having a diameter smaller than 100 μm; and not less than 85% by weight of said particles having a diameter of 100 to 500 μm.

12. The process of claim 11 wherein no more than 0.8% by weight of the polymer particles will have a diameter larger than 850 μm; no more than 5.0% by weight of polymer particles will have a diameter smaller than 100 μm; and not less than 90% by weight of the polymer particles have a diameter of from 100 to 500 μm.

13. The process of claim 1 which comprises forming from about 31,200 to 36,9000 grams of ethylene polymer per gram of catalyst.

14. The process of claim 1 for homopolymerizing ethylene.

15. A process for ethylene polymerization comprising polymerizing ethylene or copolymerizing ethylene with an α-olefin having 3 to 20 carbon atoms in such an amount that the resulting polymer contains at least 90% by mole of ethylene in the presence of a catalyst for ethylene polymerization, said catalyst comprising:

(I) a prepolymerized titanium catalyst component for ethylene polymerization obtained by
prepolymerizing an olefin to a catalyst formed by a process consisting essentially of:
mixing a halogen-containing magnesium compound, 2-ethylhexylalcohol and a hydrocarbon solvent to form a magnesium solution (a-1),
contacting the magnesium solution (a-1) with triethylaluminum (a-2) to form a solid magnesium aluminum complex (A) containing no reducing organic group, wherein the organoaluminum compound (a-2) is used in such an amount that the molar ratio of the 2-ethylhexylalcohol used for the preparation of the magnesium solution (a-1) to the aluminum atom (Al) contained in the triethylaluminum (a-2) is in the range of about 1 to 5, the temperature for contacting the magnesium solution (a-1) with the triethylaluminum (a-2) is in the range of −50° to 150° C., and the contact of the magnesium solution (a-1) with the triethylaluminum (a-2) is carried out by adding the triethylaluminum (a-2) to the magnesium solution (a-1) having a magnesium concentration of 0.005 to 2 mol/liter; and
contacting the solid magnesium aluminum complex (A) with a tetravalent titanium compound (B) to thereby form a titanium catalyst component, wherein the tetravalent titanium compound (B) is used in such an amount that atomic ratio (Ti/(Mg+Al)) of the titanium (Ti) contained in the solid magnesium aluminum complex (A) is in the range of 0.005 to 18, and the contact of the solid magnesium aluminum complex (A) with the tetravalent titanium compound (B) is carried out at a temperature of 0° to 150° C.,
wherein titanium atoms contained in the titanium catalyst component are substantially tetravalent and wherein the molar ratio of alkoxy groups derived from the 2-ethylhexylalcohol and/or unconverted 2-ethylhexylalcohol or combination thereof to titanium is in the range of 0.26 to 6.0, the atomic ratio of Ti/Mg of the titanium catalyst component is in the range of 0.01 to 1.5, and the atomic ratio of Al/Mg of the titanium catalyst component is in the range of 0.1 to 2.0; and (II) an organoaluminum compound.

16. The process of claim 15 wherein the polymerization or copolymerization is carried out in the presence of from about 0.0001 to about 0.1 mmol, in terms of Ti atom, of the titanium catalyst component (I), per liter of the polymerization reaction volume, and from 2 to 500 mol, per 1 g-atom of titanium contained in the titanium catalyst component (I), of the organoaluminum compound (II).

17. The process of claim 15 for homopolymerizing ethylene.

* * * * *